(12) United States Patent
Williams

(10) Patent No.: US 8,554,835 B1
(45) Date of Patent: Oct. 8, 2013

(54) SYSTEM AND METHOD FOR SECURE SOCIAL NETWORKING

(76) Inventor: Robert Gordon Williams, Coral Springs, FL (US)

( * ) Notice: Subject to any disclaimer, the term of this patent is extended or adjusted under 35 U.S.C. 154(b) by 102 days.

(21) Appl. No.: 13/158,378

(22) Filed: Jun. 11, 2011

Related U.S. Application Data

(60) Provisional application No. 61/353,962, filed on Jun. 11, 2010.

(51) Int. Cl.
*G06F 15/16* (2006.01)
(52) U.S. Cl.
USPC .............................. 709/203; 705/319; 726/1
(58) Field of Classification Search
None
See application file for complete search history.

(56) References Cited

U.S. PATENT DOCUMENTS

| | | | | |
|---|---|---|---|---|
| 6,941,134 | B2 * | 9/2005 | White | 455/418 |
| 7,425,169 | B2 | 9/2008 | Ganz | |
| 7,442,108 | B2 | 10/2008 | Ganz | |
| 7,465,212 | B2 | 12/2008 | Ganz | |
| 7,534,157 | B2 | 5/2009 | Ganz | |
| 7,568,964 | B2 | 8/2009 | Ganz | |
| 7,604,525 | B2 | 10/2009 | Ganz | |
| 7,618,303 | B2 | 11/2009 | Ganz | |
| 7,627,598 | B1 * | 12/2009 | Burke | 1/1 |
| 8,171,107 | B2 * | 5/2012 | Vignisson et al. | 709/217 |
| 8,219,542 | B2 * | 7/2012 | Niejadlik | 707/709 |
| 8,270,310 | B2 * | 9/2012 | Raleigh | 370/252 |
| 8,296,255 | B1 * | 10/2012 | Wawda | 706/48 |
| 2004/0003071 | A1 * | 1/2004 | Mathew et al. | 709/223 |
| 2004/0088220 | A1 * | 5/2004 | Knight et al. | 705/14 |
| 2004/0132438 | A1 * | 7/2004 | White | 455/418 |
| 2004/0198382 | A1 * | 10/2004 | Wong | 455/456.1 |
| 2004/0205586 | A1 * | 10/2004 | Cohen et al. | 715/513 |
| 2005/0044181 | A1 * | 2/2005 | Lee | 709/218 |
| 2005/0050215 | A1 * | 3/2005 | Lin et al. | 709/229 |
| 2005/0102407 | A1 * | 5/2005 | Clapper | 709/228 |
| 2005/0198319 | A1 * | 9/2005 | Chan et al. | 709/228 |
| 2006/0031870 | A1 * | 2/2006 | Jarman et al. | 725/25 |
| 2006/0242294 | A1 * | 10/2006 | Damick et al. | 709/224 |
| 2007/0271220 | A1 * | 11/2007 | Carter | 707/2 |
| 2008/0320568 | A1 * | 12/2008 | Hawkins et al. | 726/5 |
| 2009/0132656 | A1 * | 5/2009 | Ganz | 709/205 |
| 2009/0175521 | A1 * | 7/2009 | Shadan et al. | 382/129 |
| 2009/0217342 | A1 * | 8/2009 | Nadler | 726/1 |

(Continued)

OTHER PUBLICATIONS

Printout of Club Penguin—Parents' Guide, http://www.clubpenguin.com/parents/club_penguin_guide.htm, Apr. 8, 2012.

(Continued)

*Primary Examiner* — Ninos Donabed
(74) *Attorney, Agent, or Firm* — Nancy J. Flint, Esq.; Nancy J. Flint, Attorney At Law, P.A.

(57) ABSTRACT

A system and method for secure social networking is disclosed. In one embodiment, a social networking site is accessible on the Internet for use by minors that allows for adult supervision and approval for participation on the site, and provides safeguards against abuses and misuse of many social networking sites available today. In another embodiment, a social networking site on the Internet is available for use by minors that permits users to access the Internet only according to guidelines previously approved by adults for each user. The system further comprises a call screening feature that allows incoming and outgoing calls according to guidelines previously approved by adults for each user.

10 Claims, 21 Drawing Sheets

(56) References Cited

U.S. PATENT DOCUMENTS

| | | | |
|---|---|---|---|
| 2009/0254656 A1* | 10/2009 | Vignisson et al. | 709/224 |
| 2009/0287705 A1* | 11/2009 | Schneider | 707/9 |
| 2010/0114733 A1* | 5/2010 | Collas et al. | 705/26 |
| 2010/0332326 A1* | 12/2010 | Ishai | 705/14.58 |
| 2011/0004483 A1* | 1/2011 | Ting et al. | 705/1.1 |
| 2011/0041090 A1* | 2/2011 | Seolas et al. | 715/771 |
| 2011/0065419 A1* | 3/2011 | Book et al. | 455/411 |
| 2011/0314368 A1* | 12/2011 | Chevalier | 715/234 |
| 2011/0321133 A1* | 12/2011 | Grieve | 726/4 |
| 2012/0016817 A1* | 1/2012 | Smith et al. | 706/12 |
| 2012/0047560 A1* | 2/2012 | Underwood et al. | 726/4 |
| 2012/0296837 A1* | 11/2012 | Smith | 705/319 |

OTHER PUBLICATIONS

Printout of Webkinz General Questions, http://www.webkinz.com/us_en/faq_general.html, Apr. 8, 2012.

* cited by examiner

HOME  MEMBERSHIP  CONTACT US  PARENTS  KIDZ  ABOUT KIDZROCKET  HOW IT WORKS

Parent Registration

Please enter details below. (* = Required field)

Member Information
- *First Name:
- *Last Name:
- *Address1:
- Address2: (Apartment | Unit#)
- *City:
- *Country: Select Country
- *State: *
- *Zip Code:
- *Gender: Male ◉  Female ○
- *Date of Birth: MM/DD/YYYY *
- *Home Phone: 999-999-9999 for US
- Work Phone:

** Green color text indicates additional verification that you are an adult.

Basic Information
- *Email:
- *Password:
- *Confirm Password:
- *Membership Plan: Select Membership

Member Verification
- *Card Type: --Select--
- *Card Number: ☐-☐-☐-☐
- *Expiration Date: --Select-- --Select--
- *CVNumber:

The Card verification number is exactly 3-digits and appears on the back of your credit card

** We require a $1 verification charge on your credit card to ensure you are authorized to open a "Parent" account with KidzRocket.com

[Save] [Exit]

Terms of Use | Contact Us | Privacy Policy | Media Inquiry | Other Resources | Support | Newz
KidzRocket™, KidzRocket.com™, Inc.. BizRocket™, BizRocket.com™, Inc. Copyright 2009. All rights reserved. Updated on November, 2009.

FIG. 1

Logged in as Nancy Flint
LOGOUT

HOME  CONTACT US  SEARCH

- MEMBER HOME
- MY KIDS
- MESSAGES
- FAVORITE SITES
- IMAGES & VIDEOS
- MY ACCOUNT
- SETTINGS
- UPDATE PROFILE
- LOGOUT

Users >> Add User

○ Account | 8 Personal

Add/Edit Kids Details- (*= Required Fields)

Display Name: [Ann] *
Email: [ann@att.net] *
Password: [1234] *
Confirm Password: [1234] *
Parent: [Nancy Flint] *

[Next] [Cancel]

Terms of Use | Contact Us | Privacy Policy | Media Inquiry | Other Resources | Support | Newz
KidzRocket™,KidzRocket.com™, Inc., BizRocket™, BizRocket.com™, Inc. Copyright 2009. All rights reserved. Updated on November, 2009.

FIG. 2

Logged in as Nancy Flint
LOGOUT

HOME  CONTACT US  SEARCH

- MEMBER HOME
- MY KIDS
- MESSAGES
- FAVORITE SITES
- IMAGES & VIDEOS
- MY ACCOUNT
- SETTINGS
- UPDATE PROFILE
- LOGOUT

My Basic Profile > Change My Profile

○ Account | 8 Personal | △ School | 📷 Photos

Add/Edit Kids Details- (*= Required Fields)

First name: [Ann] *
Last name: [Flint] *
*Gender: Male ○  Female ◉ *
*Date of Birth: [12/12/1999] 📅 *
About me: [ ]
Hobbies: [ ]
Favorite games: [ ]
Favorite books: [ ]
Favorite movies: [ ]

[Update] [Cancel]

Terms of Use | Contact Us | Privacy Policy | Media Inquiry | Other Resources | Support | Newz
KidzRocket™,KidzRocket.com™, Inc., BizRocket™, BizRocket.com™, Inc. Copyright 2009. All rights reserved. Updated on November, 2009.

FIG. 3

Logged in as Nancy Flint
LOGOUT

HOME  CONTACT US  SEARCH

- MEMBER HOME
- MY KIDS
- MESSAGES
- FAVORITE SITES
- IMAGES & VIDEOS
- MY ACCOUNT
- SETTINGS
- UPDATE PROFILE
- LOGOUT

My Basic Profile > Change My Profile

| ○ Account | 8 Personal | △ School | 📷 Photos |

**Add/Edit Kids Details- (*= Required Fields)**
Please choose an image with size less than or equal to 120 * 60 pixels.
Photos
☑         Upload Photo: [         ] [Browse...]
☐         Upload Photo: [         ] [Browse...]
☐         Upload Photo: [         ] [Browse...]
Show on Profile

[Update] [Cancel]

Terms of Use | Contact Us | Privacy Policy | Media Inquiry | Other Resources | Support | Newz
KidzRocket™,KidzRocket.com™, Inc., BizRocket™, BizRocket.com™, Inc. Copyright 2009. All rights reserved. Updated on November, 2009.

FIG. 4

Logged in as Nancy Flint
LOGOUT

HOME   CONTACT US   SEARCH

- MEMBER HOME
- MY KIDS
- MESSAGES
- FAVORITE SITES
- IMAGES & VIDEOS
- MY ACCOUNT
- SETTINGS
- UPDATE PROFILE
- LOGOUT

My Basic Profile > Change My Profile

○ Account    8 Personal    △ School    📷 Photos

**Add/Edit Kids Details- (*= Required Fields)**

School Name: [XYZ School]  *
Grade: [4]  *
Best Friends At School: [    ]
Favourite Subjects: [    ]

[Update] [Cancel]

Terms of Use | Contact Us | Privacy Policy | Media Inquiry | Other Resources | Support | Newz
KidzRocket™,KidzRocket.com™, Inc., BizRocket™, BizRocket.com™, Inc. Copyright 2009. All rights reserved. Updated on November, 2009.

FIG. 5

Logged in as Nancy Flint
LOGOUT

HOME  CONTACT US  SEARCH

- MEMBER HOME
- MY KIDS
- MESSAGES
- FAVORITE SITES
- IMAGES & VIDEOS
- MY ACCOUNT
- SETTINGS
- UPDATE PROFILE
- LOGOUT

My Kids (Users)

No Requests for new buddies to be approved
No Pending Buddy invitations to send

Add Your Child

[Delete]   Display 25

| # | Name | Messaging | Parent (Inbox) | ☐ Select | View Friends | View Contacts |
|---|------|-----------|----------------|----------|--------------|---------------|
| 1 | Ann  |           |                | ☐        | 👥           | ⚙            |

Total kid(s) : 1

Please click on Name to edit its details.

Terms of Use | Contact Us | Privacy Policy | Media Inquiry | Other Resources | Support | Newz
KidzRocket™, KidzRocket.com™, Inc., BizRocket™, BizRocket.com™, Inc. Copyright 2009. All rights reserved. Updated on November, 2009.

FIG. 6

LOG IN
EMAIL:[_____] PASSWORD:[_____]
FORGOT YOUR PASSWORD?    [LOGIN]

HOME  MEMBERSHIP  CONTACT US  PARENTS  KIDZ  ABOUT KIDZROCKET  HOW IT WORKS  [Albanian]

Registration Successful

Thank you for registering with our site.
Your login details have been sent to the email address specified at the time of registration.

Do login and avail all the features available exclusively to members and create upto 5 accounts for your kids.

Terms of Use | Contact Us | Privacy Policy | Media Inquiry | Other Resources | Support | Newz
KidzRocket™,KidzRocket.com™, Inc., BizRocket™, BizRocket.com™, Inc. Copyright 2009. All rights reserved. Updated on November, 2009.

FIG. 7

Logged in as Nancy Flint
LOGOUT

HOME   CONTACT US   SEARCH

- MEMBER HOME
- MY KIDS
- MESSAGES
- FAVORITE SITES
- IMAGES & VIDEOS
- MY ACCOUNT
- SETTINGS
- UPDATE PROFILE
- LOGOUT

Welcome Nancy Flint. Please use the links on the left to navigate

Member Home

Images
　0 images awaiting approval.
Videos
　0 videos awaiting approval.
Friends
　0 friends awaiting approval.
Links
　0 links awaiting approval.

Terms of Use | Contact Us | Privacy Policy | Media Inquiry | Other Resources | Support | Newz
KidzRocket™, KidzRocket.com™, Inc., BizRocket™, BizRocket.com™, Inc. Copyright 2009. All rights reserved. Updated on November, 2009.

FIG. 8

Logged in as Nancy Flint
LOGOUT

HOME  CONTACT US  SEARCH

 MEMBER HOME    My Kids (Users)
 MY KIDS
 MESSAGES
 FAVORITE SITES
 IMAGES & VIDEOS
 MY ACCOUNT
 SETTINGS
 UPDATE PROFILE
 LOGOUT No Requests for new buddies to be approved
              No Pending Buddy invitations to send
                  No Kidz have been registered.
                                  <u>Add Your Child</u>

Terms of Use | Contact Us | Privacy Policy | Media Inquiry | Other Resources | Support | Newz
KidzRocket™,KidzRocket.com™, Inc., BizRocket™, BizRocket.com™, Inc. Copyright 2009. All rights reserved. Updated on November, 2009.

FIG. 9

Logged in as Ann Flint
LOGOUT

HOME

- MY HOMEPAGE
- CHAT WITH MY FRIENDS
- MY FRIENDS
- MY MESSAGES
- MY FAVORITE SITES
- MY PIX N' VIDS
- MY ROCKET SPACE
- MY ADDRESS BOOK
- MY BASIC INFORMATION
- SIGN OFF

Welcome Ann Flint. Please use the links on the left to navigate
My Homepage

Terms of Use | Contact Us | Privacy Policy | Media Inquiry | Other Resources | Support | Newz
KidzRocket™, KidzRocket.com™, Inc., BizRocket™, BizRocket.com™, Inc. Copyright 2009. All rights reserved. Updated on November, 2009.

FIG. 11

Logged in as Ann Flint
LOGOUT

HOME

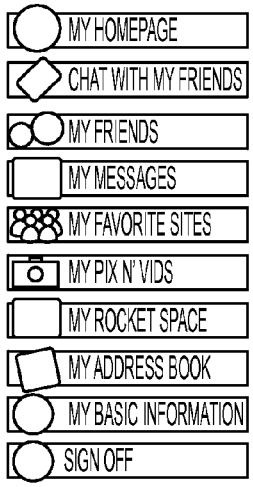

My Friends

Click Here To add a Buddy

Adding a buddy is easy! Click the "Add a Buddy" link. Then type in your friends email address or Kidzrocket.com nickname and click "Search". When you see your buddy's profile click on Add a new Buddy Terms of Use | Contact Us | Privacy Policy | Media Inquiry | Other Resources | Support | Newz
KidzRocket™,KidzRocket.com™, Inc., BizRocket™, BizRocket.com™, Inc. Copyright 2009. All rights reserved. Updated on November, 2009.

FIG. 12

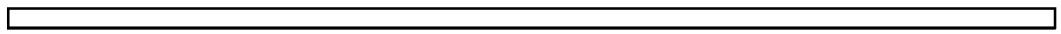

Logged in as Ann Flint
My Account | LOGOUT

HOME   MEMBERSHIP   CONTACT US   PARENTS   KIDZ   ABOUT KIDZROCKET   HOW IT WORKS   SEARCH

Search Result      [                    ]    [Search]
To add a new friend type in your friends email address or Kidzrocket user name and click search Terms of Use | Contact Us | Privacy Policy | Media Inquiry | Other Resources | Support | Newz
KidzRocket™,KidzRocket.com™, Inc., BizRocket™, BizRocket.com™, Inc. Copyright 2009. All rights reserved. Updated on November, 2009.

FIG. 13

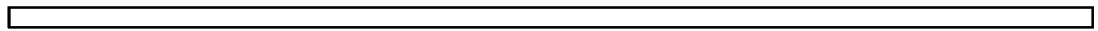

Logged in as Ann Flint
LOGOUT

HOME

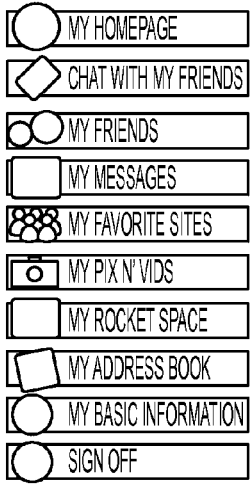

MY HOMEPAGE
CHAT WITH MY FRIENDS
MY FRIENDS
MY MESSAGES
MY FAVORITE SITES
MY PIX N' VIDS
MY ROCKET SPACE
MY ADDRESS BOOK
MY BASIC INFORMATION
SIGN OFF

My Messages

No new messages

Terms of Use | Contact Us | Privacy Policy | Media Inquiry | Other Resources | Support | Newz
KidzRocket™, KidzRocket.com™, Inc., BizRocket™, BizRocket.com™, Inc. Copyright 2009. All rights reserved. Updated on November, 2009.

FIG. 15

Logged in as Ann Flint
LOGOUT

HOME

- MY HOMEPAGE
- CHAT WITH MY FRIENDS
- MY FRIENDS
- MY MESSAGES
- MY FAVORITE SITES
- MY PIX N' VIDS
- MY ROCKET SPACE
- MY ADDRESS BOOK
- MY BASIC INFORMATION
- SIGN OFF

My Favorite Sites - Add your favorite websites here!
Add your favorite websites Add/Edit Links Details- (*= Required Fields)

Link URL: [          ] *
Description: [          ] *

Save  Exit

Terms of Use | Contact Us | Privacy Policy | Media Inquiry | Other Resources | Support | Newz
KidzRocket™,KidzRocket.com™, Inc., BizRocket™, BizRocket.com™, Inc. Copyright 2009. All rights reserved. Updated on November, 2009.

FIG. 16

Logged in as Ann Flint
LOGOUT

HOME

- MY HOMEPAGE
- CHAT WITH MY FRIENDS
- MY FRIENDS
- MY MESSAGES
- MY FAVORITE SITES
- MY PIX N' VIDS
- MY ROCKET SPACE
- MY ADDRESS BOOK
- MY BASIC INFORMATION
- SIGN OFF

My Pix N' Vids - Upload your favorite pictures and videos!

| ⬜ Albums | 📷 Photos | 🎬 Videos |
|---|---|---|
| Click 'Add Album' to add a new Photo Album ||| 
||| Add Album |

Terms of Use | Contact Us | Privacy Policy | Media Inquiry | Other Resources | Support | Newz
KidzRocket™, KidzRocket.com™, Inc., BizRocket™, BizRocket.com™, Inc. Copyright 2009. All rights reserved. Updated on November, 2009.

FIG. 17

Logged in as Ann Flint
LOGOUT

HOME

- MY HOMEPAGE
- CHAT WITH MY FRIENDS
- MY FRIENDS
- MY MESSAGES
- MY FAVORITE SITES
- MY PIX N' VIDS
- MY ROCKET SPACE
- MY ADDRESS BOOK
- MY BASIC INFORMATION
- SIGN OFF

My Address Book - Contacts Importer

Email address: [          ]
Password: [          ] (Will not be saved)

Import Contacts

Invite your friends to be your buddies on Kidzrocket.com! Use your contacts from your email account to send your friends an invitation. Just type in your email address and password, and your friends email addresses will appear! Check the boxes next to your friends names to whom you want to send an invitation and click submit. An invitation will be sent to each one. We will not save your email address and password.

Terms of Use | Contact Us | Privacy Policy | Media Inquiry | Other Resources | Support | Newz
KidzRocket™,KidzRocket.com™, Inc., BizRocket™, BizRocket.com™, Inc. Copyright 2009. All rights reserved. Updated on November, 2009.

FIG. 18

SYSTEM AND METHOD FOR SECURE SOCIAL NETWORKING

RELATED APPLICATIONS

This application claims the benefit of U.S. Provisional Patent Application No. 61/353,962, filed on Jun. 11, 2011.

FIELD OF THE INVENTION

This application relates generally to a system and method for secure social networking. One embodiment of the invention comprises a social networking site accessible on the Internet for use by minors that allows for adult supervision and approval for participation on the site, and provides safeguards against abuses and misuse of many social networking sites available today. Another embodiment of the invention comprises a social networking site on the Internet for use by minors that permits users to access the Internet only according to guidelines previously approved by adults for each user. The invention further comprises a call screening feature that allows incoming and outgoing calls according to guidelines previously approved by adults for each user.

BACKGROUND OF THE INVENTION

Technology has completely changed how people, and particularly youth, communicate and get information. Many children today have access to such "connected technology" as iPods®, instant messaging, chat, computer games, game consoles, cell phones, text messaging, webcams and of course the Internet. According to iKeepSafe.org, the three main risks with all connected technology are inappropriate contact; in appropriate content; and inappropriate conduct Social networking sites on the Internet focus on building and reflecting of social networks or social relations among people. A social network site typically includes a representation of each user (often a profile), his/her social links, and a variety of additional services. Most social network services provide means for users to interact, such as through e-mail and instant messaging. Social networking sites allow users to share ideas, activities, events, and interests within their individual networks. As more and more people turn to social networking for communication, mass media has gradually replaced interpersonal communication as a socializing force. Further, social networking sites have become popular sites for users to explore themselves, relationships, and share cultural artifacts. Social networking services allow the user to connect with friends (usually with self-description pages) and a recommendation system linked to trust. Popular sites such as Facebook® combine many of these features. There are many other sites that may be used in specific countries or geographic areas, such as MySpace®; LinkedIn®; Nexopia™; Bebo™; Hi5™; Hyves™; StudiVZ™; iWiW™; Tuenti™; Decayenne™; Tagged™; XING™; Badoo™; Skyrock™; Orkut™; Friendster™; Mixi;™ Multiply™; Wretch™; Renren™; and Cyworld™.

There is some concern of misuse of social networking sites by child and teenagers of social network services, particularly with regard to online predators. Actions have been undertaken to find solutions. Technological fixes such as age verification and scans have been found to be relatively ineffective for use in apprehending online predators. Social networking sites can also be abused to cause emotional damages by "trolling" or online bullying (aka "cyber-bullying").

Many parents are concerned of allowing their children to enjoy the social freedom offered by technology without fear of predators, strangers, or bullies. Parents want to feel secure that their children are safe on the Internet. One of the more difficult things for parents to do is know how much freedom to give to their children as opposed to how much protection to provide. The following statistics were taken from a 2007 Teen Internet Survey conducted by Children's Advocate John Walsh, the National Center for Missing & Exploited Children and Cox Communications:

71% of adolescents have set up online profiles

69% of these adolescents get online personal messages from people they do not know on a regular basis. Even more scarily, most of them do not tell a parent or another trusted adult about it.

64% of youth post photos or videos of themselves online, and almost all don't really think about who might be viewing them. 56% post info about where they live. Nearly 10% has posted their cell phone number online.

Overall, 19% of adolescents report they have been harassed or bullied online, Girls are more likely to be harassed or bullied than boys.

Adolescents with parents who have talked to them "a lot" about online safety are less likely to consider going to meet with someone they met on the Internet.

WebKinz® provides a website for young Internet users. The user first must purchase a WebKinz® pet and must use a code associated with the Webkinz® pet to log onto the website. The user can then name his/her pet and design a room for it. Users can play games in the Arcade, or compete against other players in tournaments, and answer quizzes and enter contests. Users can earn KinzCash® for shopping for his/her pet for buy toys, furniture and clothes. The website also has stories to read and other daily activities. Webkinz® offers two different chat rooms. In the first chat room, users can only express pre-constructed expressions—they cannot freely type in this chat room. A second chat room is available but can only be accessed if a parent gives permission for the user to access this chat room. In the second chat room, users can type their own messages but cannot include words or phrases that are on a blocked content list. Webkinz® asserts that its website may be covered by one or more U.S. patents, including U.S. Pat. Nos. 7,425,169; 7,442,108; 7,465,212; 7,534,157; 7,568,964; 7,604,525; and 7,618,303.

Club Penguin® is an Internet website for children to play games and interact with friends by way of penguin avatars. Users create a penguin and can chat, send greeting cards, use emotion icons, or choose from a set of pre-defined actions such as waving or dancing. Users can also attend parties and special events, take on a role in a stage play, adopt and care for a pet, and play games to earn virtual coins which can be used to design an igloo and create outfits for their penguin. To sign up for an account, a user creates a penguin avatar and enters his/her parent's email address. An email is sent to the parent, who must respond to activate the account and enter an activation code provided in the email. The parent selects one of two chat options that are similar to those offered on the Webkinz® website—one in which users can use only pre-constructed expressions—they cannot freely type in this chat room. The second chat room allows users to type their own messages which are filtered by chat filters and on-line moderators. The parent agrees to the terms of use and the user can then access the website. The parent can set up an account and set limits on their child's account. For example, the parent can set time limits for users to access the Club Penguin® website or can change the chat selection. The parent can also check the history of the user's use of the Club Penguin® account from the parent's account, such as whether the user has been banned for breaking the website rules.

SUMMARY OF THE INVENTION

The invention comprises a safe social networking website for young users that also provides protections against accessing inappropriate Internet content. The settings for the user's account on the website as well as access to the Internet are controlled by the user's parents.

In one embodiment, the invention is a web based application developed using a server side technology like PHP/ASP.NET. In one embodiment, the invention operates on the basis of software-as-a-service ("SAAS"), also called "cloud computing." In each embodiment, the invention comprises an administrative panel, a parent panel and a user panel for the respective users.

The administrator, who can be the operator of the website of the invention, can access the administrator panel, which may be secured to limited access by, for example, a password. From the administrator panel, the administrator can access modules to control various details and operations of the website. These details and operations may include any combination of the following:

1. Member Management (parents)
2. User Management (child users)
3. Audio/Video Chat Management
4. Message Management (internal email)
5. Profane Word Dictionary
6. Amber Alert Management
7. Address Book Management
8. Advertisement Management
9. Multi-Language Support
10. Image, Video and Music Upload Management
11. Payment Gateway
12. Settings
13. Alerts and Statistics
14. Profile
15. Logout Parent ("member") registration is available on the website home page. On successful registration an email is sent to the member with a link to access the parent panel. Parents can also access the panel from a separate URL. Once logged in, parents may have any combination of the following options:

1. User Management
2. Audio/Video Chat Management
3. Message Management (Custom internal email)
4. Address Book Management
5. Image, Video & Music Upload Management
6. Profile
7. Logout Parents set up user accounts for their children using the user management option in the parent panel. On successful creation of a user, the user can login to the user panel. Once logged in, users may have any combination of the following options:

1. Update Profile
2. Search Profile
3. Friends Network
4. Audio/video Chat
5. Address Book
6. Share Photo and video
7. Customize Interface
8. Post Comment/Message
9. Logout As noted, users of the website must register with the site, but first their parents must provide the website with a method of communication, such as an email, and a method of payment. Parents are informed when their child takes certain actions on the website, such as when he/she completes his/her registration; wants to connect with anyone on the site; a communication is sent to their child from any other user of the site; or their child wants to download or upload anything including pictures, videos and music. The system and method of the invention requires parental approval before any of these actions can be taken.

The parents' information must be confirmed before the child can register. Confirmation requires the provision of a valid method of payment, such as a valid credit card, which can be charged a nominal amount to verify that the parent has provided legitimate information.

Once the parent and the child have registered, the system and method of the invention allows users to design their own page; add friends; chat with friends; video chat with friends; send and receive messages; download music, videos and photos that are located within the closed network; play games; and participate in contests. Additionally, the system and method allows the downloading of web filtering software by registered users. The web filtering software can be set up according to the parent's preferences to block the user's access to websites. In one embodiment, the system and method is configured to monitor a user's incoming and outgoing cellular telephone phone calls. Parents can block incoming or outgoing calls to numbers that are determined to be aberrant or prohibited.

The website can be operated in a plurality of languages which may be selected by the user.

The invention further comprises executable computer program instructions for rendering a social networking Internet website on a user's computer. The computer source code is configured to render via a browser program resident on a user's computer a plurality of web pages that are hosted on one or more servers, where the servers can be accessed over a communications network by way of a locator address. A central programmable processing unit is in communication with the one or more servers, and a communications link is in communication with the communications network. One or more searchable databases are in communication with the one or more servers. The social networking Internet website further comprises an administrative panel, a parent panel, a user panel and a web filtering unit, where further the administrative panel is configured to access a plurality of modules to control various details and operations of the social networking Internet website, the parent panel is configured to permit a parent to register a user to use the social networking Internet website and to configure parameters for the user's access to the various details and operations of the social networking Internet website, and the user panel is configured to permit the user select options within the parameters set by the parent to access various details and operations of the social networking Internet website. The web filtering unit is configured to block the user's access to websites external to the social networking Internet website according to parameters set by the parent.

BRIEF DESCRIPTION OF THE DRAWINGS

The invention will be described with reference to the accompanying drawings, in which like elements are referenced with like numerals.

FIG. 1 depicts a screen according to one embodiment of the invention for providing payment information to the system.

FIG. 2 depicts a screen according to one embodiment of the invention for adding users to the system.

FIGS. 3-5 depict screens according to one embodiment of the invention for making entries into the system about each user.

FIG. 6 depicts a screen according to one embodiment of the invention for displaying a confirmation of each user of the system.

FIG. 7 depicts a screen according to one embodiment of the invention for noting successful registration of users with the system.

FIG. 8 depicts a screen according to one embodiment of the invention for a Parent Home Page of the system.

FIGS. 9 and 10 depict screens according to one embodiment of the invention for accessing buddy requests by each user and displaying the content of user messages.

FIG. 11 depicts a Home Page according to one embodiment of the invention after a user logs in.

FIG. 12 depicts a screen according to one embodiment of the invention for making a request to add a buddy.

FIG. 13 depicts a screen according to one embodiment of the invention for entering a buddy's name to be added.

FIG. 15 depicts a screen according to one embodiment of the invention for sending and receiving messages.

FIG. 16 depicts a screen according to one embodiment of the invention for adding favorite websites.

FIG. 17 depicts a screen according to one embodiment of the invention for uploading pictures and videos.

FIG. 18 depicts a screen according to one embodiment of the invention for uploading contacts into an Address Book.

DETAILED DESCRIPTION OF THE INVENTION

Figure 10:

The invention comprises a safe social networking website for young users that also provides protections against accessing inappropriate Internet content. The settings for the user's account on the website as well as access to the Internet are controlled by the user's parents.

In one embodiment, the invention is a web based application developed using a server side technology like PHP/ASP.NET. In one embodiment, the invention operates on the basis of software-as-a-service ("SAAS"), also called "cloud computing." In this embodiment, the application of the invention is provided to a user on-demand via a computer network, rather than from a local computer. With cloud computing, the user's computer may contain very little software or data (perhaps a minimal operating system and web browser only), serving as a basic display terminal connected to the Internet. Since the cloud is the underlying delivery mechanism, the application of the invention may be revised easily at a single source without requiring the user to download additional software to accommodate enhanced services or updated technology. In each embodiment, the invention comprises an administrative panel, a parent panel and a user panel for the respective users.

Administrative Panel: The administrator, who can be the operator of the website of the invention, can access the administrator panel, which may be secured to limited access by, for example, a password. From the administrator panel, the administrator can access modules to various details and operations of the website. These details and operations may include any combination of the following:

1. Member Management (parents)
2. User Management (child users)
3. Audio/Video Chat Management
4. Message Management (internal email)
5. Profane Word Dictionary
6. Amber Alert Management
7. Address Book Management
8. Advertisement Management
9. Multi-Language Support
10. Image & Video upload Management
11. Payment Gateway
12. Settings
13. Alerts and Statistics
14. Profile
15. Logout Member Management: From the member management module, the administrator can add, edit and delete parent member details. In one embodiment, the member listing page will list registered members with the option to edit and delete. The member management module may be searchable for parent members using search parameters.

User Management: From the user management module, the administrator can add, edit and delete child user details. A child user ("user") is a child registered by a parent. A parent can register one or more users under their parent account. In one embodiment, the user listing page lists all the added users with the option to edit and delete. The administrator may also be able to list users based on a parent. The user management module may be searchable for users using search parameters.

Audio/Video Chat Management: A chat application can be integrated into the system which would allow the users to communicate in substantially real time. A chat application that supports both audio and video support can be integrated, so that users can experience voice conversation. Users can only chat with buddies who have been approved by the parent. The administrator may control such aspects of the chat option as filtering of words, emailing the chat log, use of unique emoticons and sound.

Message Management: The administrator can view and delete internal messages sent and received by users. Internal messages can be integrated to the profane word directory for review prior to delivery to the intended recipient(s). The administrator can have the option of disabling messaging ability for users upon certain conditions, such as the user breaks the rules of the website. The administrator can set the option to receive messages sent by users to his/her inbox.

Profane Word Dictionary: A profane word dictionary tool can be implemented. Certain options in the system such as messaging, chat, etc. can be integrated with the dictionary service to filter out messages or other communications that contain profane words or other words not permitted by the system operator.

Amber Alert Management: The administrator can send Amber Alerts to all or selected parents and/or users. These "Alerts" can, for example, scroll as text across the top of the home page indicating the presence of an emergency situation. The administrator can send such alerts to parents.

Address Book Management: Admin will be able to view and delete the list of URL saved by the members (parents) and users (children).

Advertisement Management: The advertisement management module allows the administrator to place advertisements on the member and the user panels, which could be based on the subscription preference of the member. The administrator can add and delete image banner advertisements as well as text advertisements to the pages on the member and user panels.

Multi Language Support: Website content can be displayed in multiple language.

Image and video upload management: The administrator can include services for uploading video to the website by users.

Payment Gateway: A payment gateway can be integrated to the system for members to pay subscription fees.

Settings: The settings module allows the administrator to set the subscription plan and the pricing for the plans. The administrator can also set global parameters such as free subscription period, user message purge period, etc.

Alerts and Statistics: The alerts and statistics module allows the administrator to receive and review abuse reported by users. Actions such as removal of inappropriate messages, photos, etc. can be performed from this module. Statistics can be displayed such as the total number of users, members, etc. and also give details such as the number of abuses reported overall and for individual users.

Profile: The profile module allows the administrator to update login details such as username, password and email address for members and users.

Logout: The logout module allows the administrator to logout of the panel. Once logged out, the administrator must login again to gain access to the panel.

Member Panel (Parent Panel): Parent ("member") registration is available on the website home page. On successful registration an email is sent to the member with a link to access the parent panel. Parents can also access the panel from a separate URL. Once logged in, parents may have any combination of the following options:
1. User Management
2. Audio/Video Chat Management
3. Message Management (Custom internal email)
4. Address Book Management
5. Image & Video upload Management
6. Profile
7. Logout User Management: Parent may be given the option to add, edit and delete a child's details using the user management module. Parent can register one or more users under their member account. The user listing page can list the users added by the parent with the option to edit and delete.

Audio/Video Chat Management: Users can only chat with buddies who have been approved by the member (parent). In one embodiment, a chat application that supports both audio and video support can be integrated so that users can experience voice conversation. In another embodiment, chat may be conducted by text only. The system may use a profane word dictionary to filter words used in chat. Other options may also be included such as the ability to email the chat log, use unique emoticons and sound. Parents may be given the option to enable or disable chat feature for their users.

Message Management: Members can be given the option to view and delete internal messages sent and received by their users. Members may also be given the option to disable messaging ability for their users. Members may have the option to receive messages sent by users to his/her inbox.

Address Book Management: Members may have the option to view and delete the list of URL saved by their users.

Image and video upload management: Members may be given the option to view and delete the images and videos uploaded by their users.

Profile: The profile module may provide members the option to update login details for themselves and their users, such as username, password and email address.

Logout: The logout module allows member to logout of the member panel. Once logged out, the member must login again to gain access to the member panel.

User Panel: Upon successful creation of a user account by a parent through the member panel, the user can login to the user panel. Once logged in, users can have any combination of the following options:
1. Update Profile
2. Search Profile
3. Friends Network
4. Audio/video Chat
5. Address Book
6. Share Photo, Video and Music
7. Customize Interface
8. Post Comment/Message
9. Logout Update Profile: The personal profile of the user can be updated from the profile section. The profile section may be divided into sections like personal details, school details, hobbies, photo, etc. which can be updated by the user.

Search Profile: The search profile allows the user to search for friends or other profiles based on name, email address, etc.

Friends Network: Users may be permitted to send friend requests to others and can join their network of friends once the request is accepted.

Audio/Video Chat: User may be offered an interactive chat feature which can be used to chat with approved buddies within the system. A chat application that supports both audio and video support can be integrated so that the user can experience voice conversation. The chat feature must be enabled by the parent for users to use this feature. The chat may be integrated with the profane dictionary and the chat log may be emailed to the parent.

Address Book: Users may be given the option to add and delete external URLs and descriptions for future use, similar to the bookmark feature of browsers. The URLs may have to be approved by the parent before being saved.

Share Photo, Video and Music: Users may be permitted to create albums for their profile, and upload photos, videos and music to the albums. Other system users can be permitted to view these photos, videos and music. Users may be permitted to mark albums as private. Albums marked as private may be accessible only to buddies as approved by the users. The uploaded photos, videos and music may have to be approved by the parents before being published.

Customize Interface: The user can be given the option to customize his/her home page by changing backgrounds and text colors. A standard set of backgrounds can be made available with the service, and users may be able to upload a graphic and/picture to use as a background for their home page. The administrator will be notified of background changes. Standard color palates can be made available for users to select from. They may be able to change the text color, size and font type in addition to background colors. The font sizes may be offered in such sizes so as not to throw the spacing on the page off.

Post Comment/Message: User may be able to post messages and comments on the message boards of other users. The posted messages may be filtered by the profane word dictionary. Prohibited words as selected by the administrator can be filtered out with a warning to the posting user. Users may have the option to reply to a message posted by other users.

Logout: The logout option allows users to logout of the panel. Once logged out, the user must login again to gain access to the panel.

Users of the website must register, but first their parents must provide the website with a method of communication, such as an email, and a method of payment. Parents are informed when their child completes his/her registration; wants to connect with anyone on the site; a communication is sent to their child from any other user of the site; or their child wants to download or upload anything including pictures and videos. The system and method of the invention requires parental approval before any of these actions can be taken.

A parent of a user of the website accesses the URL of the website and opens a parental account which typically requires the selection of a user name and a password to access the account. Once logged on to the parental website account, the parent must provide contact information and payment information to the website. Contact information typically includes one or more email addresses for the website to contact the parent for various purposes, including authorization of actions that can be taken by the user. Payment information typically includes credit card information. Through the parental account, the parent may select settings for the user such as child's name, child's user name and password to access the website, website categories that will be restricted and may not be accessed by the child.

The parents' information must be confirmed before the child can register as a user. The website will confirm that the contact information provided by the parent is valid by sending a confirmation message, such as an email, and receiving a responsive message. Payment information must also be confirmed by charging a nominal amount to verify that the parent has provided legitimate information. The redundant confirmation methods help to better ensure that the parental account has in fact been set up by a parent/adult, and is not a sham account allowing a child to register as a user.

Once the parental information is confirmed, the parent may register his/her children on the website and assign user names and passwords for the children to log in. The user can then explore the website within the limits of the settings that were set up by the parent through the parental account.

The system and method of the invention allows users to design their own page; add friends; chat with friends; video chat with friends; send and receive messages; download music, videos and photos that are located within the closed network; play games; and participate in contests. Other features of the website can include the following:

Multi-chat: The ability of a user to chat with more than one individual simultaneously with or without video capabilities with his/her own neighborhood of known friends.

Multi-video: The ability of a user to exchange live video images with more than one individual simultaneously with his/her own neighborhood of known friends. This capability can be simultaneous with the multi-chat capability previously noted.

Homework assistance: Provide Internet based, at-home, and away-from-home homework assistance resources to parents to allow users the opportunity to excel academically and assisted through learning remediation.

Kids Calendar: Offer various calendar modalities for users of various age and maturity allowing them to learn age-appropriate organizational skills.

Contests: Offer online age appropriate fun with virtual rewards to users for various achievements at home, school, or contest wins.

Best photo: Best photo contests can be offered for various genre-subject matter. Age-appropriate virtual prizes can be awarded to various levels of winning participants.

Best video, etc.: Best video contests can be offered for various genre-subject matter. Age-appropriate virtual prizes can be awarded to various levels of winning participants.

Community related events: Parents can post community based news items, and various activities of interest to their local communities.

Fun and Educational games: Users can compete with friends for fun and challenging age-appropriate games.

Create Artwork with contests: Users can compete with friends for virtual prizes.

Videos: Users can view interesting age-appropriate videos for fun and learning.

The system and method of the invention may use over-the-counter, third party applications to perform these functions. However, the website controls access of the users to these functions and allows contact between users only if approved by the parents of all users. For example, if a user wants to interact with another user, each user must request that the other user be added as a contact. The parents of both users must approve the request in order for the two users to interact. The parents of each user are contacted of both the request by their child and also the request by the other user. Only after the parents of both users have consented can these two users communicate. If the first user attempts to contact the second user, the contact request is received by the website which determines if these two users have been authorized to perform that function, in this example, to exchange messages. Only if both users are authorized by their parents to perform this function is the message sent to the second user.

Further, the parents may restrict the types of communication between the users. For example, in one embodiment, the parents may allow their child to send or receive messages from another user but not chat or video chat. In another embodiment, users may interact using all available methods once both of their parents approve communications between the users. Similarly, if a user uploads information such as a blog entry, a contest entry, a video or a picture, the parent will be contacted and approval must be given before the information is posted to the website.

The website further comprises screening ability to screen messages or content that contains certain content.

Additionally, the system and method allows the downloading of web filtering software by registered users. The web filtering software can be set up according to the parent's preferences to block access to websites. One embodiment of the web filtering system comprises a program resident on the user's computer that allows for the blocking of websites according to categories, e.g. adult, news, sports, etc. When a URL is entered into a browser program resident on that same computer, an inquiry is sent to a third party website that maintains a catalog of substantially all known websites that have been tagged by category, where the categories of the web filtering program are substantially identical to the categories of the cataloged websites. The third party website returns the category of the URL to the web filtering program. A comparison is made to determine if the category of the entered URL is a permitted or blocked category on the web filtering program. If the URL is permitted, the browser is permitted to connect to the URL. If the URL is blocked, the browser is not permitted to connect to the URL. Additionally, the user's attempt to bring up a blocked website is logged so the parent can see attempts made by users to view unauthorized content. In one embodiment, different category settings can be made in the web filtering program for different user accounts on the same computer.

In one embodiment, the system and method is configured to monitor a user's incoming and outgoing cellular telephone phone calls. Optionally, land lines can be included. The system and method can comprise hard wired and "cloud computing" systems. In one embodiment of the phone filtering system, the system comprises a program that allows for the blocking of incoming or outgoing phone calls according to a predetermination of permitted and prohibited phone numbers. Incoming and outgoing telephone calls are analyzed. The system and method is configured to receive, record, and flag specific, unknown, or strange telephone numbers as identified according to the parent's preferences. Telephone numbers can be matched with the name(s) of the person(s) attached to that each incoming or outgoing telephone number. Telephone numbers can further be matched against a publicly available list of known pedophiles and sex offenders. Parents can print a list of all calls made or received by the user as desired.

Parents can request to receive notice by any communication means, for example email, text, IM, Facebook® post or telephone, of aberrant, suspect, or unfamiliar incoming or outgoing telephone numbers to or from the user's cellular telephones or home telephone lines, as determined by parent's preferences. For example, parents may indicate that calls originating from one or more area codes, such as "toll free" numbers, are suspect. A unique audible sound can be made available to alert parents of such events.

The website may charge subscription fees for use of its services. Such subscription fees typically will include monthly access fees. Alternatively, the master website may sell advertising space and provide the services free to users.

The invention further comprises executable computer program instructions for rendering a social networking Internet website on a user's computer. The computer source code is configured to render via a browser program resident on a user's computer a plurality of web pages that are hosted on one or more servers, where the servers can be accessed over a communications network by way of a locator address. A central programmable processing unit is in communication with the one or more servers, and a communications link is in communication with the communications network. One or more searchable databases are in communication with the one or more servers. The social networking Internet website further comprises an administrative panel, a parent panel, a user panel and a web filtering unit, where further the administrative panel is configured to access a plurality of modules to control various details and operations of the social networking Internet website, the parent panel is configured to permit a parent to register a user to use the social networking Internet website and to configure parameters for the user's access to the various details and operations of the social networking Internet website, and the user panel is configured to permit the user select options within the parameters set by the parent to access various details and operations of the social networking Internet website. The web filtering unit is configured to block the user's access to websites external to the social networking Internet website according to parameters set by the parent.

The system and method can be used by any user who can access the website over any known or later developed communications network by any suitable device now known or later developed. Suitable devices include, but are not limited to, general purpose computers; laptop computers; thin clients; PDAs; cell phones; satellite phones; and smartphones. The device must be capable of rendering and displaying pages created by any markup language now known or later developed which are transmitted over the communications network by the master website by any web browser program now known or later developed. Suitable markup languages include, but are not limited, to, HTML and XHTML. Suitable web browser programs include, but are not limited to, Amaya™; AOL Explorer™; Avant™; Camino™; Dillo™; DocZilla™; ELinks™; Epiphany™; Flock™; Galeon™; Google Chrome™; iCab™; Internet Explorer™; Internet Explorer for Mac™; K-Meleon™; Konqueror™; Links™; Lynx™; Maxthon™; Midori™; Mosaic™; Mozilla™; Mozilla Firefox™; Netscape™; Netscape Browser™; Netscape Navigator™; Netscape Navigator 9™; NetSurf™; OmniWeb™; Opera™; Safari™; SeaMonkey™; Shiira™; Sleipnir™; WorldWideWeb™; and w3m™.

The website comprises a plurality of web pages hosted on one or more servers accessed over the communications network by way of a locator address, such as a URL or URI. The one or more servers include or are in communication with a central processing unit ("CPU"), or processor; a communications link to the communications network; and one or more searchable databases.

Turning to the figures, FIGS. 1-9 illustrate web shots of the registration process of a parent in the system and method of the invention. When the parent registers, he/she must provide payment information as seen in FIG. 1. As noted, a nominal charge is charged to confirm that the payment information is correct and also as a check that the registrant is an adult. As seen in FIG. 2, the parent adds children as users which includes setting up a user name and password for each child. FIGS. 3-5 display entries the parent can make about each user such as hobbies, favorite games, favorite books, photos and school information. FIG. 6 displays a confirmation of each user on the parent's account. A "Successful Registration" message may be displayed as seen in FIG. 7.

Once the parent has set up information for each user, he/she will be shown a "Parent Home" page as seen in FIG. 8. As seen in FIGS. 9 and 10, the parent has access to buddy requests by each user and the content of user messages.

Figure 14:
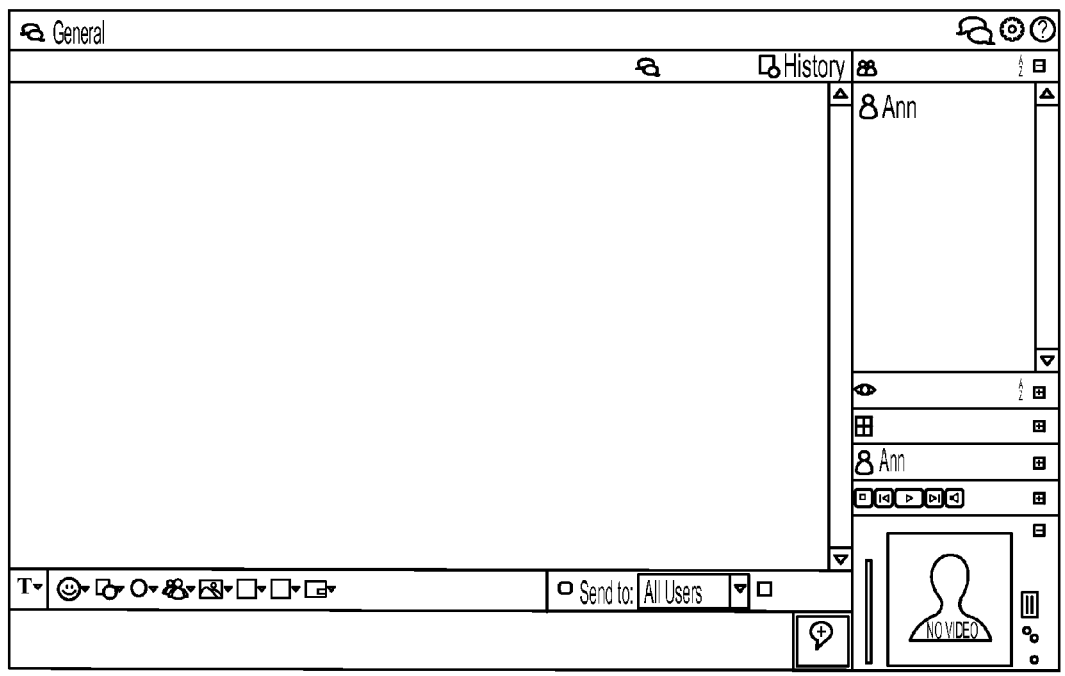
FIG. 14 depicts a screen according to one embodiment of the invention for chatting with other users after buddy requests are approved.

Each user may then access the website by logging in and having his/her "Home" page displayed as seen in FIG. 11. The user can access the various features of the website by clicking on the buttons on the panel of the "Home" page. The user may request to add a buddy, as seen in FIG. 12, and enter the buddy's user name as seen in FIG. 13. If the request is approved by parents of both users, these users can chat with each other as seen in FIG. 14. Each user can send and receive messages as seen in FIG. 15; add favorite websites as seen in FIG. 16; and upload pictures and videos as seen in FIG. 17. Each user may also upload contacts into an Address Book, as seen in FIG. 18.

Figure 19:
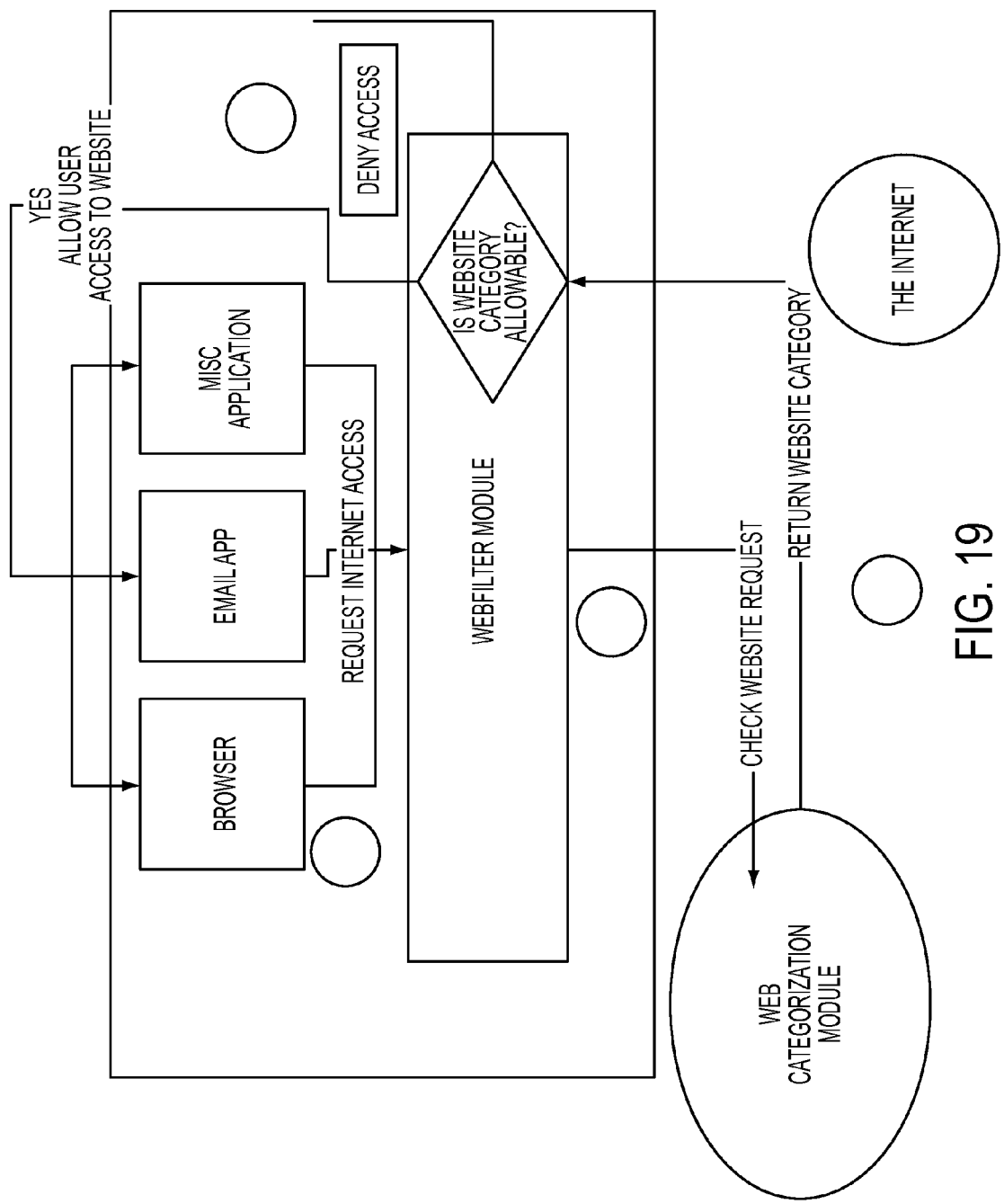
FIG. 19 depicts a flow diagram of a web filter system and method for use in the system and method of the invention.

FIG. 19 is a flow diagram of a web filter system and method for use in the system and method of the invention. When a request for a website is made from a user's computer, such as through a browser, an email application or a miscellaneous application, the request is sent to a module which redirects the request from a DNS to a site which checks for the category of the requested URL in its memory. The category of the requested URL is determined and this category is returned to the module. If the URL is permitted according to rules set in the web filter software on the user's computer, the user is allowed to access the web site. If the URL is prohibited according to rules set in the web filter software on the user's computer, access to the requested web site is denied. A log is maintained on the user's computer of URLs that were requested and access was denied.

Figure 20:
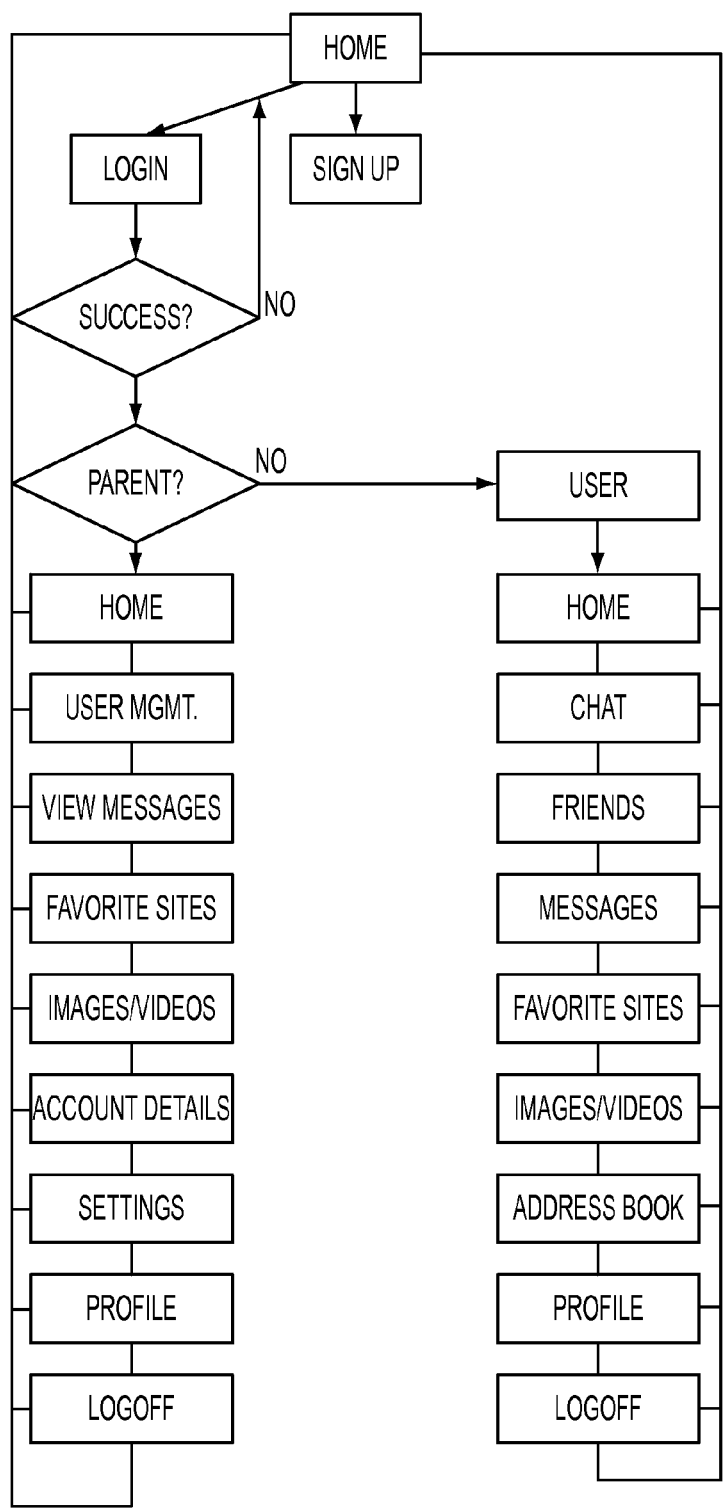
FIG. 20 depicts a flow diagram of the operation of one embodiment of the method of the invention.

FIG. 20 is a flow diagram of the operation of one embodiment of the method of the invention whereby a parent or user logs into the system. Upon a successful login, the system determines if the person logging in is a parent or a user, and directs the person to the appropriate home page. The parent or user can then access any of the modules associated with his or her account, and can logout of the system.

Figure 21:
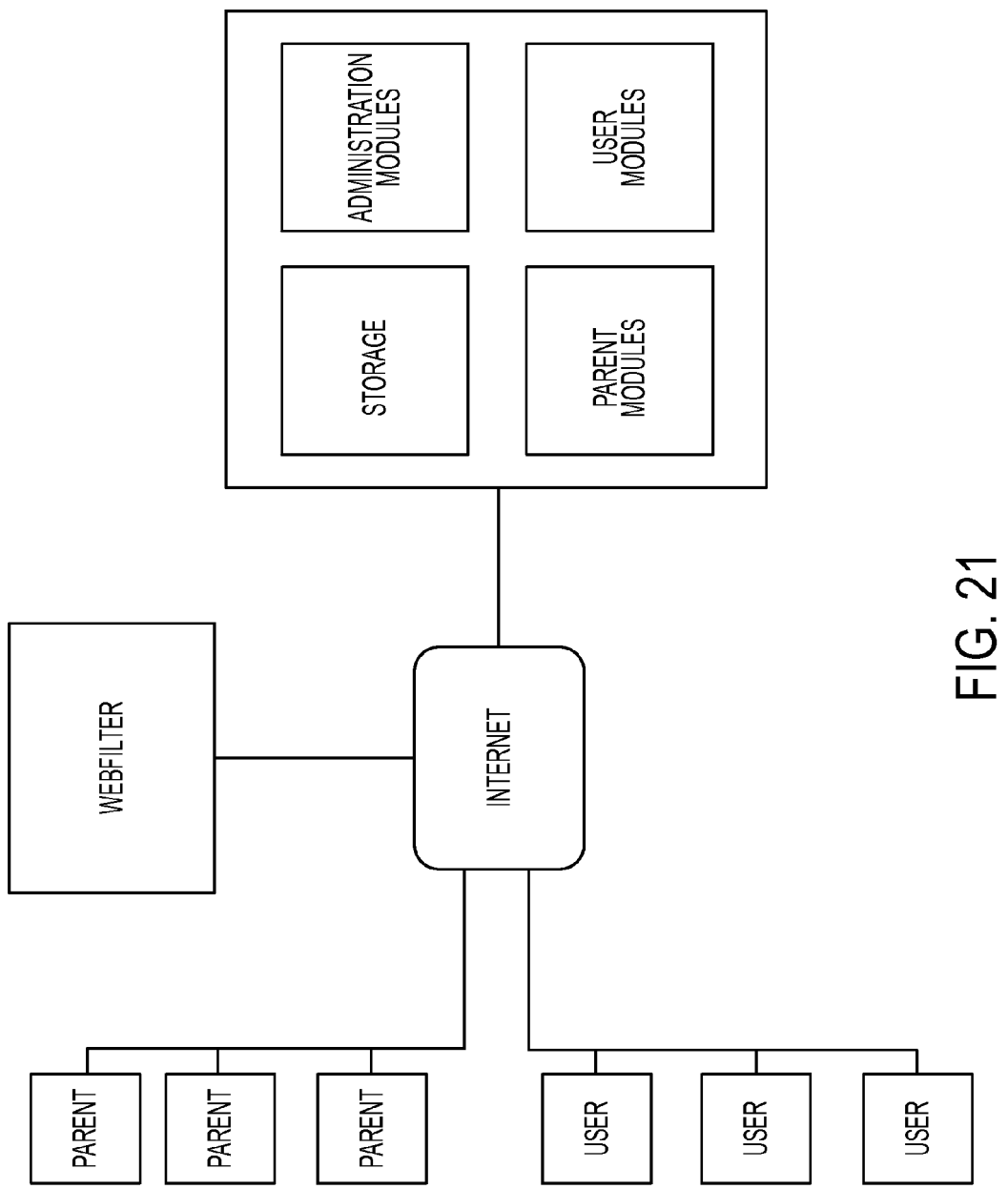
FIG. 21 depicts a schematic of one embodiment of the invention.

FIG. 21 is a schematic of one embodiment of the invention. Parents and users can access the system over the Internet. The system comprises a storage unit, administration modules, parent modules and user modules, as previously described. Files associated with administration of the website, parent accounts and user accounts can be stored in the storage unit. The system further comprises a programmable processor configured to carry out tasks programmed according to the desired operation of the system. Certain requests taken by the user, such as requesting to add a friend to his/her list, can be transmitted to the associated parent account for approval by the parent before the two users can communicate in the system. Further, if a user requests a website, that request can be transmitted to a web filter site to determine if the site may be accessed by the user according to filters set by the parent.

The foregoing embodiments have been presented for the purpose of illustration and description only and are not to be construed as limiting the scope of the invention in any way.

What is claimed is:

1. A social networking system, comprising:
a master website, comprising:
a plurality of web pages hosted on one or more servers, wherein the one or more servers can be accessed over a communications network by way of a locator address;
a memory and a central programmable processing unit in communication with the one or more servers;
a communications link in communication with the communications network; and
one or more searchable databases in communication with the one or more servers,
wherein the master website further comprises an administrative panel, a parent panel, a user panel and a web filtering unit,
wherein further the administrative panel is used to access a plurality of modules to control various details and operations of the master website,
wherein further the parent panel is used to permit a parent of a user to register the user to use the master website and to set parameters for the user's access to the various details and operations of the master website,
wherein further the user panel is used to permit the user to select options within the parameters set by the parent to access various details and operations of the master website,
wherein further the web filtering unit is used to block the user's access to websites external to the master website according to parameters set by the parent,
wherein the parent of the user of the system registers with the system before the user can access the system,
wherein further the parent sets parameters within the modules comprising the parent panel that controls the options available to the user within the user panel,
wherein the parent sets up a communication link by which the parent registers with the system, and thereafter confirms intent to register with the system via a separate communication link, wherein further thereafter the user sets UP an account with the system within the modules comprising the user panel;
the web filtering unit comprises a computer program resident on the user's computer, wherein the web filtering unit is used to block the user's access to websites external to the system, wherein upon entry of a Uniform Resource Locator (URL) by the user into the user's computer browser program while logged onto the system, the web filtering unit:
maintains a list of categories of websites, wherein the parent selects the categories of websites that the user is permitted to access over the Internet;
transmits an inquiry to a third party website comprising the entered URL, wherein the third party website maintains a catalog of websites that have been tagged by various categories that are searchable by URL, wherein further the categories maintained by the third party website are identical to the categories of websites maintained by the web filtering unit;
receives a response from the third party website comprising the category of the entered URL; and
compares the category of the entered URL as received from the third party website to the categories of websites selected by the parent that can be accessed by the user over the Internet;
wherein the user is permitted to access the website associated with the entered URL if the category of the entered URL favorably compares to any of the categories of websites selected by the parent that can be accessed by the user over the Internet;
wherein further the user is blocked from accessing the website associated with the entered URL if the category of the entered URL fails to favorably compare to any of the categories of websites selected by the parent that can be accessed by the user over the Internet;
wherein further the system maintains a list of URL's entered by the user for which access to the associated websites are blocked by the web filtering unit,
wherein further the parent can access the list of blocked URLs;
and a call monitoring unit used to monitor the user's incoming and outgoing telephone calls,
wherein the call monitoring unit receives information identifying telephone numbers of incoming and outgoing telephone calls made from a telephone number associated with the user,
wherein further the call monitoring unit maintains a list of preferences set by the parent regarding permitted and prohibited telephone numbers for incoming and outgoing telephone calls of the user,
wherein further the call monitoring unit allows the incoming or outgoing call to be completed if the incoming or outgoing telephone number is permitted by the parent,
wherein further the call monitoring unit denies the incoming or outgoing call to be completed if the incoming or outgoing telephone number is prohibited by the parent,
wherein further the parent can monitor all incoming and outgoing calls from the telephone number associated with the user.

2. The system of claim 1, wherein the administrative panel comprises modules to control Member Management, User Management, Audio/Video Chat Management, Message Management, Profane Word Dictionary, Amber Alert Management, Address Book Management, Advertisement Management, Multi-Language Support, Image, Video & Music Upload Management, Payment Gateway, Settings, Alerts and Statistics, Profile, Logout or any combination thereof.

3. The system of claim 2, wherein the parent panel comprises modules to control User Management, Audio/Video Chat Management, Message Management, Address Book Management, Image, Video & Music Upload Management, Profile, Logout and any combination thereof.

4. The system of claim 3, wherein the user panel comprises modules to control Update Profile, Search Profile, Friends Network, Audio/Video Chat, Address Book, Share Photo, Video & Music, Customize Interface, Post Comment/Message, Logout and any combination thereof.

5. The system of claim 1, wherein the parent provides a method of payment of fees for use of the system.

6. A memory containing executable computer program instructions for rendering a social networking system on a user's computer, comprising:

computer source code stored in the memory and rendering via a browser program resident on the user's computer a social networking Internet website with a plurality of web pages, wherein the plurality of web pages are hosted on one or more servers, wherein the one or more servers can be accessed over a communications network by way of a locator address;

wherein a central programmable processing unit is in communication with the one or more servers;

wherein a communications link is in communication with the communications network; and wherein one or more searchable databases are in communication with the one or more servers, wherein the social networking Internet website further comprises an administrative panel, a parent panel, a user panel and a web filtering unit, wherein further the administrative panel is used to access a plurality of modules to control various details and operations of the social networking Internet website, wherein further the parent panel is used to permit a parent of a user to register the user to use the social networking Internet website and to set parameters for the user's access to the various details and operations of the social networking Internet website, wherein further the user panel is used to permit the user to select options within the parameters set by the parent to access various details and operations of the social networking Internet website, and wherein further the web filtering unit is used to block the user's access to websites external to the social networking Internet website according to parameters set by the parent, wherein the parent of the user of the social networking Internet website registers with the social networking Internet website before the user can access the social networking Internet website, wherein further the parent sets parameters within the modules comprising the parent panel that control the options available to the user within the user panel;

wherein the parent sets up a communication link by which the parent registers with the social networking Internet website, and thereafter confirms intent to register with the social networking Internet website via a separate communication link, wherein further thereafter the user sets UP an account with the social networking Internet website within the modules comprising the user panel;

wherein the web filtering unit comprises a computer program resident on the user's computer, wherein the web filtering unit is used to block the user's access to websites external to the social networking Internet website, wherein upon entry of a Uniform Resource Locator (URL) by the user into the user's computer browser program while logged onto the social networking Internet website, wherein the web filtering unit:

maintains a list of categories of websites, wherein the parent selects the categories of websites that the user is permitted to access over the Internet;

transmits an inquiry to a third party website comprising the entered URL, wherein the third party website maintains a catalog of websites that have been tagged by various categories that are searchable by URL, wherein further the categories maintained by the third party website are identical to the categories of websites maintained by the web filtering unit;

receives a response from the third party website comprising the category of the entered URL; and compares the category of the entered URL as received from the third party website to the categories of websites selected by the parent that can be accessed by the user over the Internet;

wherein the user is permitted to access the website associated with the entered URL if the category of the entered URL favorably compares to any of the categories of websites selected by the parent that can be accessed by the user over the Internet;

wherein further the user is blocked from accessing the website associated with the entered URL if the category of the entered URL fails to favorably compare to any of the categories of websites selected by the parent that can be accessed by the user over the Internet;

wherein further the social networking Internet website maintains a list of URL's entered by the user for which access to the associated websites are blocked by the web filtering unit, wherein further the parent can access the list of blocked URL's, and a call monitoring unit used to monitor the user's incoming and outgoing telephone calls, wherein the call monitoring unit receives information identifying telephone numbers of incoming and outgoing telephone calls made from a telephone number associated with the user, wherein further the call monitoring unit maintains a list of preferences set by the parent regarding permitted and prohibited telephone numbers for incoming and outgoing telephone calls of the user, wherein further the call monitoring unit allows the incoming or outgoing call to be completed if the incoming or outgoing telephone number is permitted by the parent, wherein further the call monitoring unit denies the incoming or outgoing call to be completed if the incoming or outgoing telephone number is prohibited by the parent, wherein further the parent can monitor all incoming and outgoing calls from the telephone number associated with the user.

7. The executable computer program instructions of claim 6, wherein the executable computer program instructions are resident on the user's computer.

8. The executable computer program instructions of claim 6, wherein the executable computer program instructions are resident on a server geographically remote from the user's computer.

9. The executable computer program instructions of claim 6, wherein:

the administrative panel comprises modules to control Member Management, User Management, Audio/Video Chat Management, Message Management, Profane Word Dictionary, Amber Alert Management, Address Book Management, Advertisement Management, Multi-Language Support, Image, Video & Music Upload Management, Payment Gateway, Settings, Alerts and Statistics, Profile, Logout or any combination thereof;

the parent panel comprises modules to control User Management, Audio/Video Chat Management, Message Management, Address Book Management, Image, Video & Music Upload Management, Profile, Logout and any combination thereof; and the user panel comprises modules to control Update Profile, Search Profile, Friends Network, Audio/Video Chat, Address Book, Share Photo, Video & Music, Customize Interface, Post Comment/Message, Logout and any combination thereof.

10. The executable computer program instructions of claim 6, wherein the parent provides a method of payment of fees for use of the social networking Internet website.

\* \* \* \* \*